(12) United States Patent
Fan et al.

(10) Patent No.: US 10,114,731 B2
(45) Date of Patent: Oct. 30, 2018

(54) INCLUDING KERNEL OBJECT INFORMATION IN A USER DUMP

(71) Applicant: EMC Corporation, Hopkinton, MA (US)

(72) Inventors: Xiaohua Fan, Shanghai (CN); Feng Yin, Chengdu (CN); Xiaogang Wang, Shanghai (CN); Dazhi Dong, Shanghai (CN); Binhua Lu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 576 days.

(21) Appl. No.: 14/581,392

(22) Filed: Dec. 23, 2014

(65) Prior Publication Data

US 2015/0186246 A1 Jul. 2, 2015

(30) Foreign Application Priority Data

Dec. 30, 2013 (CN) .......................... 2013 1 0755993

(51) Int. Cl.
*G06F 11/00* (2006.01)
*G06F 11/36* (2006.01)
*G06F 11/07* (2006.01)

(52) U.S. Cl.
CPC .......... *G06F 11/366* (2013.01); *G06F 11/079* (2013.01); *G06F 11/0715* (2013.01); *G06F 11/0778* (2013.01)

(58) Field of Classification Search
CPC .............. G06F 11/0778; G06F 11/079; G06F 11/0793; G06F 11/366; G06F 11/0757; G06F 2201/81; G06F 2201/86; G06F 11/0766; G06F 11/3604; G06F 11/3664; H04L 41/0631
See application file for complete search history.

(56) References Cited

U.S. PATENT DOCUMENTS

| | | | | | |
|---|---|---|---|---|---|
| 5,594,861 | A | * | 1/1997 | Jonsson | G06F 11/0715 379/242 |
| 5,611,044 | A | * | 3/1997 | Lundeby | G06F 11/25 714/38.11 |
| 5,907,709 | A | * | 5/1999 | Cantey | G06F 11/366 714/E11.211 |
| 6,615,364 | B1 | * | 9/2003 | Nagasuka | G06F 11/073 714/24 |
| 7,028,056 | B1 | * | 4/2006 | Hendel | G06F 11/3636 |
| 7,047,447 | B2 | * | 5/2006 | Cantrill | G06F 11/366 711/170 |
| 7,290,180 | B2 | * | 10/2007 | Duron | G06F 11/0745 714/43 |
| 7,301,448 | B1 | * | 11/2007 | Usery | H04L 43/0817 340/506 |
| 7,302,613 | B2 | * | 11/2007 | Bliss | G06F 11/3476 714/37 |

(Continued)

*Primary Examiner* — Loan L. T. Truong
(74) *Attorney, Agent, or Firm* — BainwoodHuang

(57) ABSTRACT

An improved method of analyzing software issues may include retrieving and storing selected data elements from the operating system kernel data prior to performing a memory dump. The method of retrieving the selected kernel data may include creating a thread dedicated to collecting the data and storing it in a memory location for analysis after the memory dump. The operating system kernel data may be analyzed in conjunction with the prior art dump data to identify a root cause of the software issue.

15 Claims, 2 Drawing Sheets

(56) References Cited

U.S. PATENT DOCUMENTS

| | | | |
|---|---|---|---|
| 7,376,864 B1 | 5/2008 | Hu et al. | |
| 7,487,380 B2* | 2/2009 | Brumme | G06F 11/1482 712/216 |
| 7,516,362 B2* | 4/2009 | Connelly | G06F 11/0709 709/248 |
| 7,594,136 B2* | 9/2009 | Kerner | G06F 11/0727 714/42 |
| 7,594,142 B1* | 9/2009 | O'Leary | G06F 21/577 714/38.11 |
| 7,610,322 B2 | 10/2009 | Grunkemeyer | G06F 21/52 |
| 7,649,841 B2* | 1/2010 | Gunawardena | H04L 47/10 370/231 |
| 7,734,945 B1* | 6/2010 | Levidow | G06F 11/0793 714/3 |
| 7,818,616 B2* | 10/2010 | Kathail | G06F 11/0706 713/1 |
| 7,958,512 B2* | 6/2011 | Lupu | G06F 11/366 718/107 |
| 8,095,513 B2* | 1/2012 | Grunkemeyer | G06F 12/0261 707/687 |
| 8,156,378 B1* | 4/2012 | Suit | G06F 11/0709 714/26 |
| 8,166,313 B2* | 4/2012 | Fedtke | G06F 21/6254 713/161 |
| 8,341,650 B1* | 12/2012 | Veerabhadraiah | G06F 11/3433 714/1 |
| 8,549,360 B2* | 10/2013 | Masser | G06F 11/0709 714/38.12 |
| 8,707,305 B2 | 4/2014 | Hendel | |
| 8,726,092 B1 | 5/2014 | Gray et al. | |
| 8,776,093 B2 | 7/2014 | Lupu et al. | |
| 8,887,274 B2 | 11/2014 | Buchanan et al. | |
| 8,996,743 B1* | 3/2015 | Alanis | G06F 11/1451 710/8 |
| 9,026,860 B2* | 5/2015 | Akirav | G06F 11/1612 714/45 |
| 9,043,653 B2 | 5/2015 | Martineau et al. | |
| 9,075,912 B2* | 7/2015 | Rhee | G06F 11/3636 |
| 9,223,679 B1* | 12/2015 | Ho | G06F 11/362 |
| 9,256,489 B2* | 2/2016 | Mahajan | G06F 11/079 |
| 9,274,842 B2* | 3/2016 | Maltz | G06F 9/5027 |
| 9,354,962 B1* | 5/2016 | Dong | G06F 11/079 |
| 9,436,534 B2* | 9/2016 | Sankaran | G06F 11/0754 |
| 9,594,617 B2* | 3/2017 | Wang | G06F 11/0706 |
| 9,632,857 B2* | 4/2017 | Aranguren | G06F 11/0778 |
| 2002/0144006 A1* | 10/2002 | Cranston | G06F 9/544 719/312 |
| 2004/0221120 A1* | 11/2004 | Abrashkevich | G06F 12/023 711/170 |
| 2006/0156380 A1* | 7/2006 | Gladstone | G06F 21/52 726/1 |
| 2007/0011415 A1* | 1/2007 | Kaakani | G06F 12/0269 711/159 |
| 2010/0077253 A1* | 3/2010 | Lynch | G06F 11/2033 714/5.11 |
| 2012/0179936 A1* | 7/2012 | Masser | G06F 11/0709 714/38.11 |
| 2013/0066928 A1* | 3/2013 | Nagaraja | H04L 69/32 707/815 |
| 2013/0067285 A1* | 3/2013 | Szegedi | G06F 21/6254 714/45 |
| 2014/0040671 A1* | 2/2014 | Akirav | G06F 11/1612 714/45 |
| 2014/0115403 A1* | 4/2014 | Rhee | G06F 11/3636 714/38.1 |
| 2014/0149799 A1* | 5/2014 | Buendgen | G06F 11/0778 714/38.11 |

\* cited by examiner

INCLUDING KERNEL OBJECT INFORMATION IN A USER DUMP

CROSS-REFERENCE TO RELATED APPLICATIONS

This Patent Application claims priority to Chinese Patent Application No. 201310755993.9 filed on Dec. 30, 2013, entitled "INCLUDING KERNEL OBJECT INFORMATION IN A USER DUMP," the contents and teachings of which are hereby incorporated by reference in their entirety.

BACKGROUND

Storage arrays in data storage systems are controlled by storage processors that process data store and data access requests from host computers. Storage processors are computers that have software designed to handle input and output requests from other computers or electronic devices needing access to large memory capacity.

In a storage processor, a computer software program may not always perform exactly as intended, and there may be problems or glitches in the software that need to be corrected or fixed. Along these lines, consider handle leaks, which happen because the pool of available file handles gets exhausted when file handles are not properly returned to the pool after usage. The storage processor adds a file handle to a file to simplify handling and tracking of the file while it is in the storage processor. When the file is deleted from the storage processor, software in the storage processor is supposed to cause the storage processor to return the file handle to the pool for reassignment to another file. If the storage processor does not always return the file handle of a deleted file to the pool, then eventually the number of available file handles will be exhausted.

To determine where the issue is located in the software operation, a failure analyst will look at what the computer software program, known as a thread, was doing at the time of the failure. The data used by the failure analyst may be found in what is known as a memory dump file. A dump is essentially a snapshot of the thread status. A memory dump does not have to be a system crash, but may be used for data gathering.

The computer may generate a memory dump file before the program reboots, in order to provide some information for the failure analyst to use to identify where in the program code the fault maybe found and a root cause. Conventional software issue identification methods involve examining the memory dump file.

SUMMARY

Unfortunately, there are deficiencies with the above-described conventional software issue identification methods. For example, the memory dump file may not always provide sufficient data for an analyst to determine or identify a root cause of the software issue. For example, in the file handle leakage situation discussed above where the program handling the files fails to return the file handle to the pool when the file is deleted, the dump file alone may not provide enough information to easily identify a root cause of the software issue. This is because the file handle data in the memory may not have a file name associated with each of the file handles, and the particular thread of the software producing the software issue may be difficult to identify without knowing the file names associated with the issue.

In contrast to the above described conventional software issue identification methods, improved techniques involve retrieving and storing selected data elements from the operating system (OS) kernel prior to performing a memory dump. Retrieving OS kernel data may include creating a thread dedicated to collecting the data and storing it in a memory location for analysis after the memory dump. The operating system kernel data will be analyzed either alone or in conjunction with the memory dump data to identify a root cause of the software issue. The selected data elements from the operating system kernel can include file names associated with outstanding file handles, and sync objects such as mutex, critical section, event, and semaphore data. Operating system kernel data can be used to more easily identify the location in the software that is having handle leak issues, deadlock issues, process hanging issues and thread hanging issues.

In an arrangement, a system for identifying a software issue in a computer includes a communication interface, a memory and a processing circuit with a controller. The processing circuit can execute a software process to store OS kernel data in a memory location prior to a memory dump caused by a software issue. The OS kernel data can be analyzed either alone or in conjunction with memory dump data to identify a root cause, and generate an alert when a root cause is identified.

In an arrangement, a computer program product with a non-transitory computer readable medium stores a set of instructions performing a method of identifying a software issue, by storing and analyzing operating system kernel data for identifying a root cause of the software issue.

Figure 1:
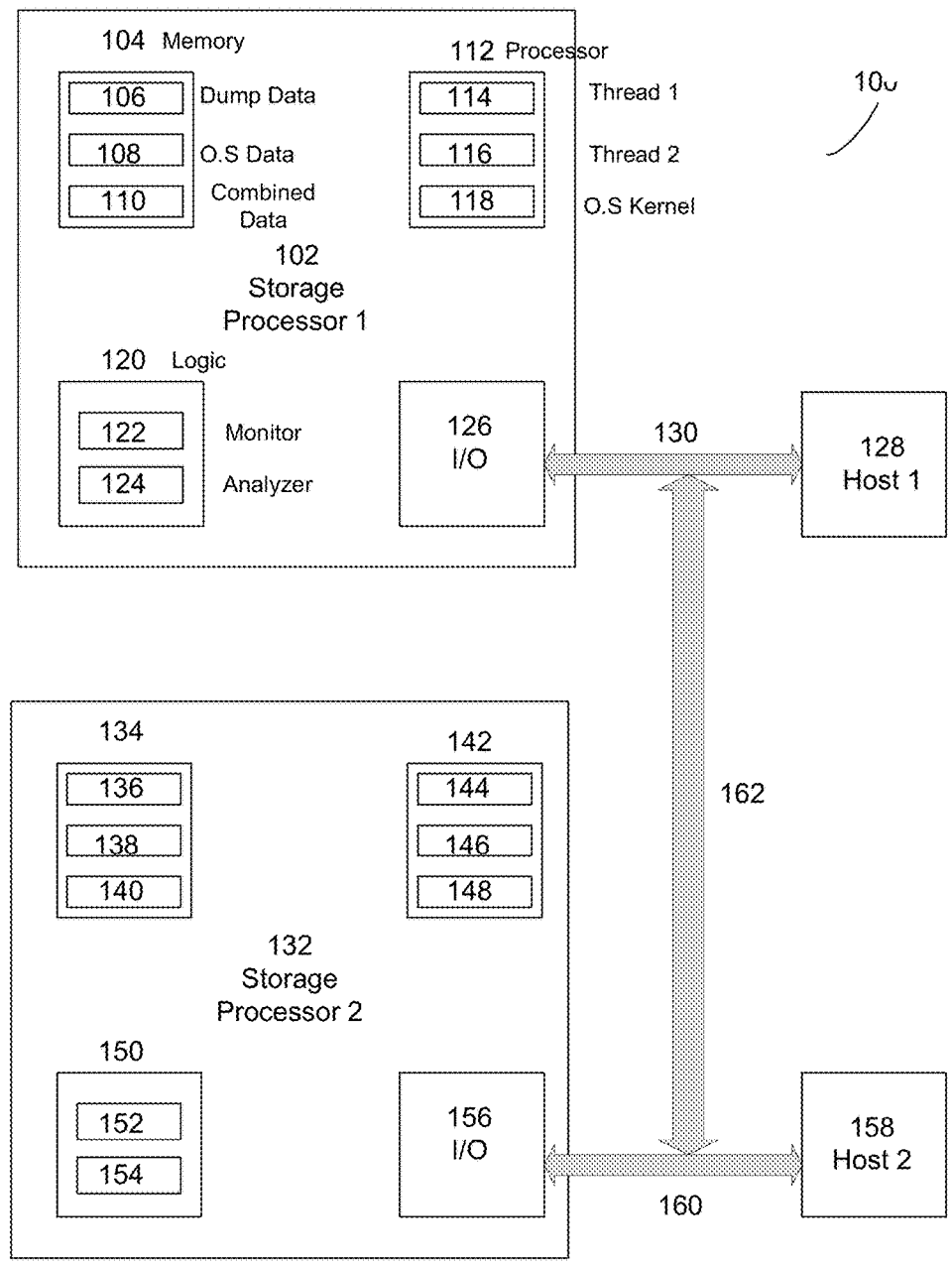
FIG. 1 is a block diagram of exemplary components of an electronic device that is enabled to identify a software issue.

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

FIG. 1 is a block diagram of exemplary components of an electronic device 100 that is enabled to identify a software issue. The electronic device may be a computer, for example, a storage processor such as 102 or 132, and may receive and store data from host servers such as hosts 128 and 158, and recover and transmit data to host servers 128 and 158.

The storage processor 102 has a memory 104, a processor 112, a logic circuit 120 and an input/output (I/O) unit 126. The memory 104 has a set of memory locations, some of which are used to store data obtained from the memory dump operation in a memory section 106. A memory section 108 is used to store data obtained from the OS kernel 118, and a memory section 110 is used to store the integrated data from both the memory dump 106 and the OS kernel memory 108. The integrated data in memory section 110 may be the addition of the two memory sections, or it may be calculated values from various forms of analysis such as may be created by the logic circuit 120. There may be portions of memory 104 which are used for storing results from the root cause analysis, or historical trend data.

The processor 112 may operate a set of individual program steps, which may be known as a thread. For example, thread 1 may be located at a portion of the processor shown as 114, and may be handling data store requests and data retrieve requests for a portion of a set of hosts, such as 128 or 158 via bus 130. Thread 2 at location 116 may be handling requests from a different set of hosts or users, or for a different storage processor, such as storage processor 132, via buses 130, 160 and 162.

Processor 112 may be the only processor in storage processor 102, or it may be one of a set of individual processors. Processor 112 has an operating system (OS) program that controls its actions, and an OS kernel 118 has information stored in a memory location in processor 112. The OS kernel will include tables of pointers and maps that associate a data file with the logical and physical location of the file in the storage processor 102, and shortcuts such as file handles that are attached to the files.

The logic circuit 120 may include circuitry 122 for monitoring the status of operation of the various threads 114 and 116. For example, if the number of file handles available in the pool is less than a threshold, the monitor 122 may look at the recent past trend in the number of file handles in the pool to determine that a handle leak software problem exists. The monitor 122 may initiate a thread to collect selected elements of information from the OS kernel, such as the file names associated with the file handles that have not been returned to the pool even though the files have been deleted, and send the data to the analyzer 124, and store the data in memory location 108. With such an arrangement, data needed for proper analysis may be obtained if a file dump occurs, or the root cause of the handle leakage may be discovered prior to a failure.

The I/O unit 126 controls input and output communications between the various portions of storage processor 102 and other storage processors, for example, 132, and hosts 128 and 158. I/O unit 126 may also communicate with a storage processor user or manager, and with other devices.

Figure 2:
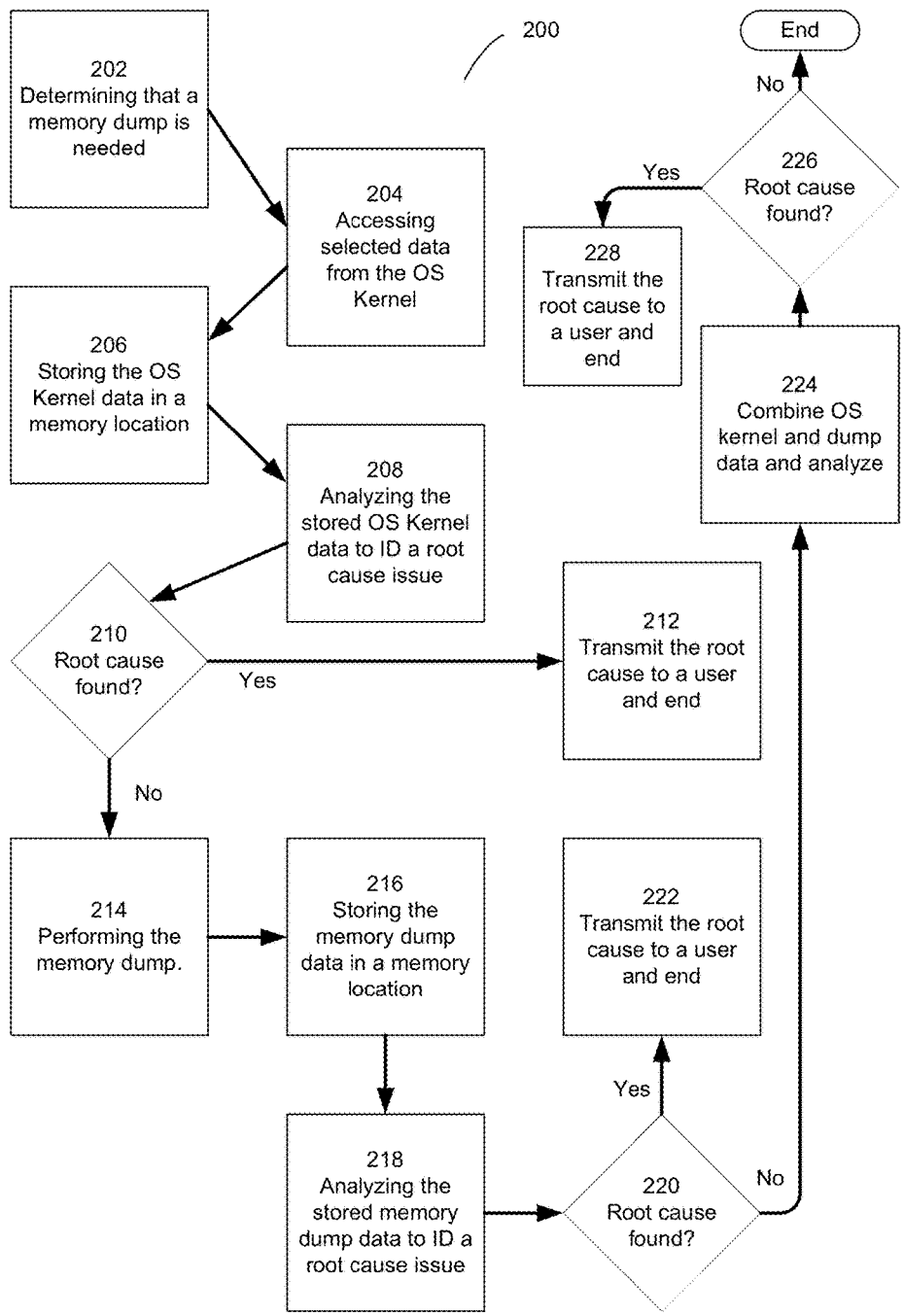
FIG. 2 is a flow chart of a procedure performed by the electronic device of FIG. 1.

FIG. 2 is a flow chart of a procedure 200 performed by the electronic device 100 of FIG. 1, where at step 202 it is determined that a memory dump may be needed. For example, the monitor 122 of FIG. 1 may note that a number of file handles available has been steadily dropping, or a connection between thread 114 and a host 128 or another thread 116 has not responded for more than a selected time period, i.e., the thread has hung up. In either of these situations, or with many other possible issue warning signs, the logic circuit 120 may determine that a memory dump may occur and initiate action. A memory dump may be considered a snapshot of the state of a program operation or thread status, and does not necessarily imply an overall system crash. The memory dump process may simply include storing the status of the thread at a known time point, and rebooting the part of the system at issue.

At step 204 the logic circuit 120 accesses selected data from the OS kernel 118, and at step 206 stores the selected data in a memory location 108 in memory 104. Examples of the type of OS kernel data 108 that may be useful to a failure analyst includes file names for the file and event handles, mutex, semaphore, event, critical section, process thread hang and critical timeout data.

At step 208 either an analyst looks at the OS kernel data, or the analyzer 124 of the logic circuit 120 examines the stored OS kernel data, to identify a root cause for the software issue. If a root cause can be identified at step 208, then at step 210 the root cause is transmitted at step 212 via I/O 126 to a user of the storage processor, such as a manager of the storage processor, or the user of host 128 if that user has management authority.

If no root cause is identified at step 208 then at step 210 the method moves to step 214 where the logic circuit 120 performs a memory dump, and at step 216 stores the dump data in memory location 106 of memory 104. At step 218 either an analyst looks at the dump data, or the analyzer 124 of the logic circuit 120 examines the dump data, to identify a root cause for the software issue. If a root cause can be identified at step 220, then at step 222 the root cause is transmitted to the user of the storage processor, such as a manager of the storage processor 102.

If no root cause can be identified, then the method moves to step 224 where the logic circuit 120 combines the OS kernel data 108 and the dump data 106 to form combined data 110 in the memory 104. The combined data may be the addition of the OS kernel data to the dump data, or it may be mathematically transformed by the logic 120, or it may involve historical trend data or extrapolated data as well. Also at step 224 the combined data is analyzed, by either an analyst or the analyzer 124, to identify a root cause of the software issue.

At step 226, if a root cause has been identified at step 224 the root cause is transmitted by I/O 126 to the user. If no root cause has been identified the method ends, and the analyst will perform test procedures on the storage processor to reproduce the software issue and attempt to identify a root cause.

With such an arrangement many root causes of software issues in electronic devices can be automatically identified, or the task of the failure analyst is improved and resolved more quickly.

As used throughout this document, the words "comprising," "including," and "having" are intended to set forth certain items, steps, elements, or aspects of something in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has used storage processors directly connected by bus communication lines to other storage processors and host servers, however, the storage processors do not need to use bus lines for communication, and wireless, RF, infrared, communication lines may be used. The communications may also use network connections, such as the internet or cloud and need not be directly wired. Furthermore, the arrangements discussed may be used by any electronic device and not simply limited to storage processors, and any computer may use the described arrangement or equivalent apparatus and instructions to automatically obtain operating system information that may be relevant to failure analysis.

The improvements or portions thereof described herein may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

While various embodiments of the invention have been particularly shown and described, it will be understood by those skilled in the art that various changes in form and details may be made therein without departing from the spirit and scope of the invention as defined by the appended claims.

What is claimed is:

1. A method of identifying a software issue in a data storage system, comprising:
   storing selected operating system kernel data in a memory location of the data storage system;
   analyzing the stored operating system kernel data in the memory location identifying a root cause of the software issue from the analyzed operating system kernel data; and
   transmitting an alert to a user after the root cause is identified, the alert identifying the root cause to the user;
   wherein the method further comprises:
      performing, after storing the selected operating system kernel data in the memory location, a memory dump operation configured to output memory dump data of a software process associated with the data storage system;
      storing memory dump data in another memory location; and
      analyzing the memory dump data, analysis of the memory dump data and the operating system kernel data providing the identification of the root cause of the software issue;
   wherein the selected operating system kernel data is stored at a time selected based on a number of available handles in a thread of the data storage system; and
   wherein the method further comprises:
      comparing the number of available handles to a selected minimum handle threshold level of available handles for the thread;
      when the number of available handles is below the selected minimum handle threshold level, generating a collection thread to collect file name data for each file handle from the operating system kernel;
      storing the file name data in the memory location; and
      initiating the memory dump operation.

2. The method as in claim 1, further comprising:
   integrating the stored selected operating system kernel data in the memory location with the stored data resulting from the memory dump operation in the other memory location to form an integrated data set; and
   analyzing the integrated data to provide identification of the root cause of the software issue.

3. The method as in claim 2, further comprising;
   generating, after the root cause is identified, a suggested solution to the software issue; and
   transmitting the suggested solution to the user.

4. The method as in claim 1, wherein storing the selected operating system kernel data further includes:
   generating at least one thread for gathering sync object data, the sync object data including at least one of mutex, semaphore, event, critical section, process thread hanging and critical timeout data; and
   storing the gathered sync object data in the memory location.

5. The method as in claim 4 further comprising:
   obtaining, when gathering critical timeout data, an address of a different software process associated with the critical timeout data;
   generating a memory dump of selected data from the different software process;
   storing the memory dump of selected data from the different software process in a memory location;
   analyzing the operating system kernel data in conjunction with the memory dump of selected data of the different software process to identify a root cause of the software issue; and
   transmitting an alert to the user after the root cause is identified.

6. The method as in claim 5 further comprising:
   generating a suggested solution to the software issue; and
   transmitting the suggested solution to at least one of the user and a second user of the different software process.

7. The method of claim 1, wherein the method further includes, in response to an instruction to delete a file:
   storing a file name associated with the file and a file handle associated with the file at a time prior to receiving the instruction;
   detecting, after the file has been deleted, that the file handle remains associated with the file; and
   in response to detecting that the file handle remains associated with the file, including the file name and the file handle in the selected operating system kernel data.

8. The method of claim 1, wherein the method further comprises including file handle trend data in the selected operating system kernel data, the trend data including a history of a number of available file handles in the thread of the data storage system;
   wherein analyzing the selected operating system kernel data includes detecting a trend in the file handle trend data which indicates a handle leak software problem exists and identifying it as the root cause of the software issue; and
   wherein transmitting the alert includes identifying file handle leakage as the root cause of the software issue to the user.

9. A system for identifying a software issue in a computer, comprising:
   a communication interface;
   a memory;
   a processing circuit, including a controller, coupled to the memory and communication interface, the controller being constructed and arranged to:
      execute, by the processing circuit, a series of computer commands to perform a software process;
      store selected operating system kernel data in a first memory location of the memory;
      analyze, by the processing circuit, the operating system kernel data in the first memory location to identify a root cause of the software issue; and
      transmit, by the communication interface, an alert to a user when a root cause is identified;
   wherein further the controller is constructed and arranged to:
      perform, after storing the selected operating system kernel data in the first memory location, a memory dump operation of a software process associated with the data storage system;
store memory dump data resulting from the memory dump operation in a second memory location;
analyze, by the processing circuit, the data in the first and second memory locations to identify a root cause of the software issue; and
wherein further the controller is constructed and arranged to:
store the selected operating system kernel data at a time selected by measuring, by the processing circuit, a number of available handles in a thread of the data storage system;
compare, by the processing circuit, the number of available handles to a selected minimum handle threshold level of available handles for the thread;
create, when the number of available handles is below the selected minimum handle threshold level, a thread to collect file name data for each file handle from the operating system kernel;
store the file name data in the first memory location; and
initiate the memory dump operation.

10. The system as in claim 9, wherein further the controller is constructed and arranged to:
integrate the stored selected operating system kernel data in the first memory location with the stored memory dump data in the second memory location;
generate, when the root cause is identified, a suggested solution to the software issue, and
transmit the suggested solution to the user.

11. The system as in claim 9, wherein the controller is constructed and arranged to store the selected operating system kernel data, further includes:
create at least one thread for gathering sync object data, the sync object data including at least one of mutex, semaphore, event, critical section, process thread hanging and critical timeout data; and
store the gathered sync object data in the first memory location.

12. The system as in claim 11 wherein further the controller is constructed and arranged to:
obtain, when gathering critical timeout data, an address of a different software process associated with the critical timeout data;
generate a memory dump of selected data from the different software process;
store the memory dump of selected data in a third memory location; analyze the operating system kernel data in the first memory location in conjunction with the memory dump of selected data of the different software process in the third memory location; and
generate a suggested solution to the software issue; and transmit the suggested solution to at least one of the user and a second user of the different software process.

13. A computer program product having a non-transitory computer readable medium which stores a set of instructions for launching a client application, the set of instructions causing a computerized device to perform a method of identifying a software issue via a memory dump, the method comprising:
storing selected operating system kernel data in a first memory location;
analyzing the stored operating system kernel data in the first memory location identifying a root cause of the software issue; and
transmitting an alert to a user when a root cause is identified;
wherein the method further comprises:
performing, after storing the selected operating system kernel data in a first memory location, a memory dump operation of a software process associated with the data storage system; storing memory dump data resulting from the memory dump operation in a second memory location;
integrating the stored selected operating system kernel data in the first memory location with the stored data resulting from the memory dump operation in the second memory location to form an integrated data set;
analyzing the integrated data set to identify a root cause of the software issue;
generating, when the root cause is identified, a suggested solution to the software issue; and
transmitting the suggested solution to the user; and
wherein the method further comprises:
storing the selected operating system kernel data occurs at a time selected by measuring a number of available handles in a thread of the data storage system;
comparing the number of available handles to a selected minimum handle threshold level of available handles for the thread;
creating, when the number of available handles is below the selected minimum handle threshold level, a collection thread to collect file name data for each file handle from the operating system kernel;
storing the file name data in the first memory location; and
initiating the memory dump operation.

14. The computer program product as in claim 13 wherein storing the selected operating system kernel data further includes creating at least one thread for gathering sync object data, the sync object data including at least one of mutex, semaphore, event, critical section, process thread hanging and critical timeout data; and
storing the gathered sync object data in the first memory location.

15. The computer program product as in claim 14 further comprising:
obtaining, when gathering critical timeout data, an address of a different software process associated with the critical timeout data;
generating a memory dump of selected data from the different software process;
storing the memory dump of selected data in a third memory location;
analyzing the operating system kernel data in the first memory location in conjunction with the memory dump of selected data of the different software process in the third memory location; and
generating a suggested solution to the software issue, and transmitting the suggested solution to a user of the different software process.

* * * * *